May 4, 1948. W. J. VAN WORMER, JR., ET AL 2,440,814
PLASTIC DISPLAY RACK
Filed Jan. 17, 1946 3 Sheets-Sheet 1

INVENTORS
Willard J. van Wormer, Jr.
Theodore W. Hawkins
BY
M. Y. Charles
ATTORNEY.

May 4, 1948. W. J. VAN WORMER, JR., ET AL 2,440,814
PLASTIC DISPLAY RACK
Filed Jan. 17, 1946 3 Sheets-Sheet 2
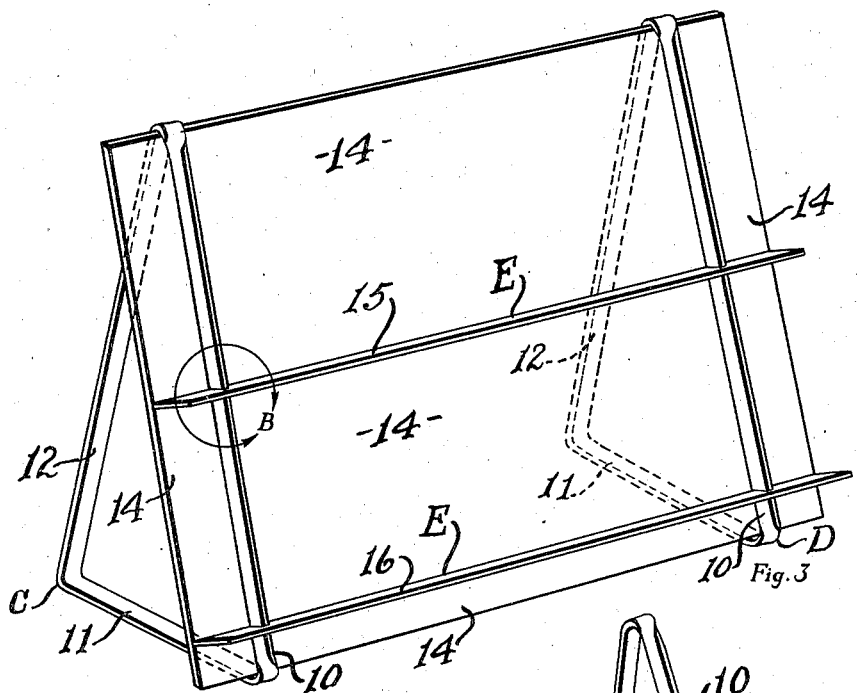
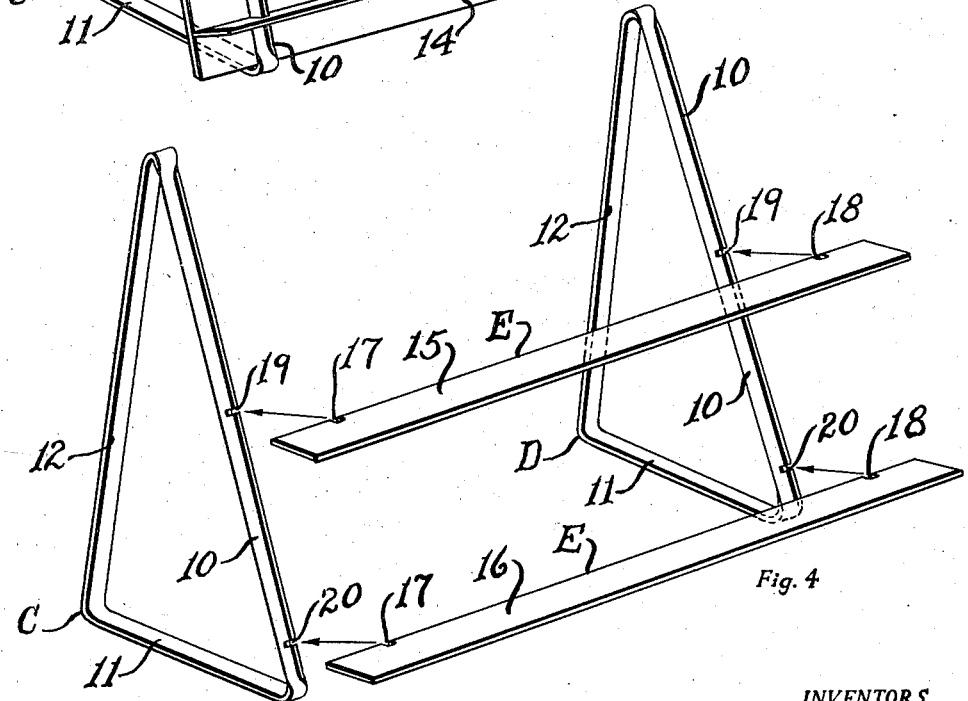
INVENTORS
Willard J. Van Wormer, Jr
Theodore W. Hawkins
BY
M. Y. Charles
ATTORNEY.

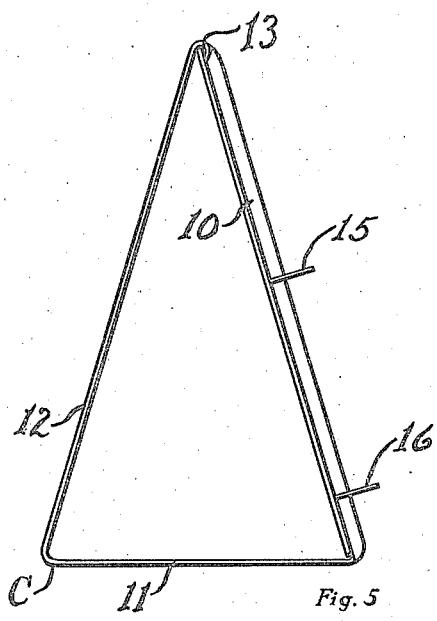
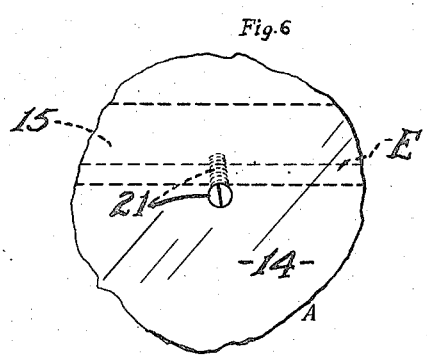
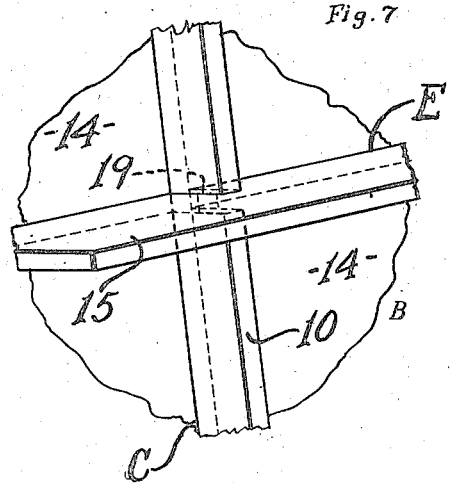

Patented May 4, 1948

2,440,814

UNITED STATES PATENT OFFICE 2,440,814

PLASTIC DISPLAY RACK

Willard J. van Wormer, Jr., and Theodore W. Hawkins, Wichita, Kans., assignors to McCormick Armstrong Company, Wichita, Kans.

Application January 17, 1946, Serial No. 641,789

4 Claims. (Cl. 211—72)

Our invention relates to an improvement in plastic display racks, and has for its object to provide a display rack that is neat in appearance and one that is strong and substantial and one that is preferably transparent.

A further object is to provide a display rack of the kind mentioned that can be easily and quickly taken to pieces and put in a compact space for storage or shipping, and one that can be easily and quickly assembled for use.

A still further object is to provide a display rack of the kind mentioned that is cheap to make and one that is not too expensive to buy.

This display rack is especially adaptable for the display of magazines, railroad time tables, photographs, or merchandise of any kind that can be placed on the supporting elements of the rack. These and other objects will be more fully explained as this description progresses.

Now referring to the accompanying drawings in which similar numerals of reference designates the same parts throughout the several figures of the drawings—

Fig. 3 is a perspective view of the display rack.

Fig. 4 is a detail perspective view of the supporting elements of the display rack shown in expanded portion.

Fig. 5 is an end view of the display rack.

Fig. 6 is an enlarged detail of the structure contained in the circle A in Fig. 2.

Fig. 7 is an enlarged detail view of the structure contained in the circle B in Fig. 3.

Figure 1:
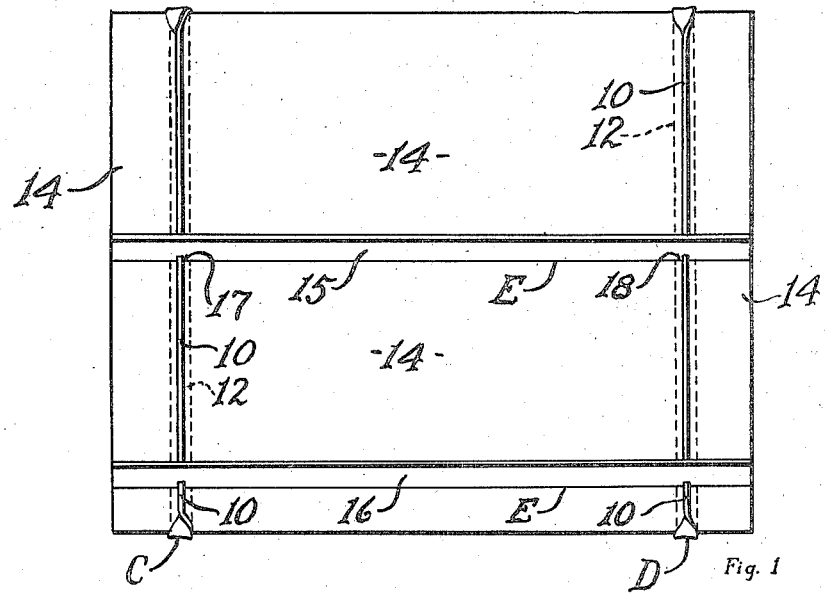
Fig. 1 is a front elevational view of the display rack.
Figure 2:
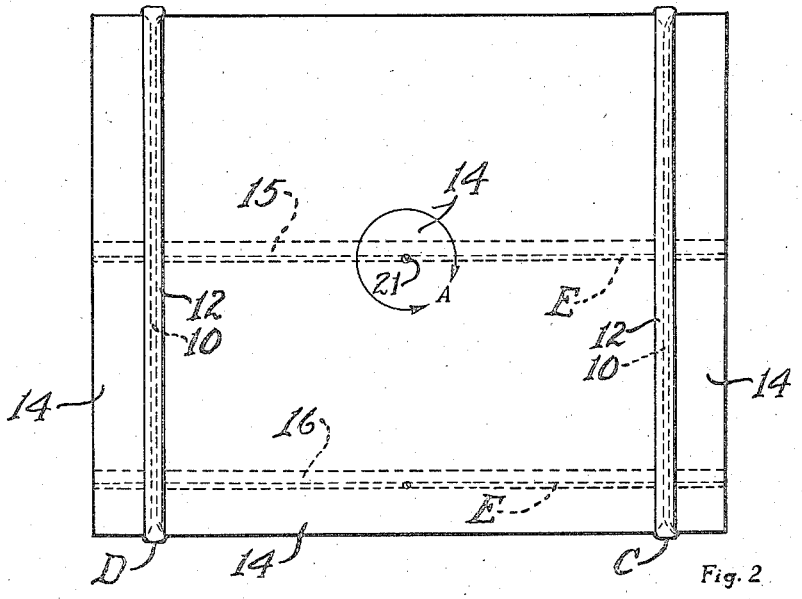
Fig. 2 is a rear elevational view of the display rack.

In the drawings the display rack is shown as having a pair of scalene or isosceles triangles C and D. The front legs 10 of the triangles C and D are turned edge ways while the bases 11 and rear legs 12 are turned flat way with respect to the front legs 10. If desired, the front legs 10 of the triangles C and D may be made of an L-shaped cross section and the top end of the rear legs 12 may be provided with a hook formation 13 that is adaptable to hook over the upper ends of the legs 10 as shown in Fig. 5.

The display rack is provided with a support plate 14 that is of such height that the plate 14 will fit snugly in the top and front angles of the triangles C and D and rest against the back side of the front triangle legs 10.

The device is provided with a plurality of shelf element such as there shown at 15 and 16. The rear edges of the shelves 15 and 16 are provided with notches 17 and 18 that are the same width as the front legs 10 of the triangles C and D and approximately half the depth of the triangle legs 10; and the triangle legs 10 are provided with notches 19 and 20 that are the same width as the thickness of the shelves 15 and 16, and approximately half the depth of the triangle legs 10. To assemble the shelves 15 and 16 on the rack, the shelves 15 and 16 are positioned before the triangle legs 10 with the notches 17 and 18 in registry with the notches 19 or 20 in the triangle legs 10 and then moved rearwardly until the rear edge E of the shelves 15 and 16 rest against the front surface of the wall plate 14 and the shelves 15 and 16 have been received in the notches 19 or 20, and the triangle legs 10 have been received in the notches 17 and 18 in the shelves 15 and 16 whereupon the shelves 15 and 16 are supported by the triangle legs 10 and stationed longitudinally by the notch assembly above described. The shelves 15 and 16 having been placed as above described a screw 21 of either plastic or metal material is passed through a hole in the wall plate 14 and threaded into the edge of the shelves 15 or 16 to rigidly bind and hold the assembly of the rack together. It will be understood that one or more screws 21 may be used for each shelf 15 or 16 if desired or deemed necessary.

The above described assembly is one that rigidly binds and holds the front legs 10 of the triangles C and D between the shelves 15 and 16 and the wall or plate 14 so that there is no looseness between any of the elements of the structure. Also, due to the reclining position of the front legs 10 of the triangles C and D the wall or plate 14 leans rearwardly and the shelves 15 and 16 are rigidly held at an angle of substantially ninety degrees thereto, therefore the shelves 15 and 16 also tip downwardly from front to back so that articles such as magazines, folders of various kinds, newspapers and the like will not fall off the shelves 15 and 16.

It is desirable to make the rack of transparent plastic material for appearance and neatness although it will be understood that the rack may be made of colored plastic or other kinds of material if desired.

Due to the method of assembly of the rack as above described, it is obvious that the screws 21 may be removed and the rack may be readily taken to pieces and the pieces piled in a flat compact pile or bundle for packing so the rack can be easily crated or put in a common ordinary paper or wood box for shipping or storage purposes.

Such modification of the invention may be employed as lie within the scope of the appointed claims without departing from the spirit and instruction of the invention. Now having fully shown and described our invention, what we claim is:

1. In a display rack of the kind described; said rack having a plurality of skeleton triangular support elements, each element comprising legs connected by a base, a wall and shelves, said wall being positioned within the skeleton triangular support elements and fitting snugly in two of the corners thereof, said shelves being positioned against the said wall with the adjacent legs of the skeleton triangular support elements interposed therebetween, and screw means for binding and holding the shelves to the wall.

2. In a display rack of the kind described, and as described in claim 1, said shelves and adjacent skeleton triangle support legs, being mortised together for the co-support and fixed positioning of each other.

3. In a display rack of the kind described and as defined in claim 1; the several elements of said rack being made of transparent material.

4. In a display rack of the kind described and as defined in claim 1; said shelves and adjacent skeleton triangle support legs being morticed together as a means of supporting the shelves at a fixed angle relative to the adjacent skeleton triangle support legs and said wall.

WILLARD J. van WORMER, Jr.
THEODORE W. HAWKINS.

REFERENCES CITED

The following references are of record in the file of this patent:

UNITED STATES PATENTS

| Number | Name | Date |
|---|---|---|
| 542,014 | Glaeser | July 2, 1895 |
| 1,182,936 | Shearer | May 16, 1916 |
| 1,204,920 | Williamson | Nov. 14, 1916 |
| 1,819,814 | Hansen | Aug. 18, 1931 |
| 1,927,635 | Garfunkel | Sept. 19, 1933 |

FOREIGN PATENTS

| Number | Country | Date |
|---|---|---|
| 23,811 | Great Britain | 1911 |